United States Patent [19]
Stempien

[11] Patent Number: 6,102,097
[45] Date of Patent: Aug. 15, 2000

[54] APPARATUS FOR MANUFACTURING A GRAPHIC PRODUCT

[75] Inventor: Joseph W. Stempien, Newington, Conn.

[73] Assignee: Gerber Scientific Products, Inc., Manchester, Conn.

[21] Appl. No.: 09/420,743

[22] Filed: Oct. 20, 1999

Related U.S. Application Data

[62] Division of application No. 09/009,961, Jan. 21, 1998.

[51] Int. Cl.$^7$ .......................... G05G 15/00; B32B 31/00; B41J 2/32; G01D 15/10; B44C 1/00

[52] U.S. Cl. .......................... 156/359; 156/353; 156/230; 156/241; 156/247; 156/289; 156/268; 156/510; 156/543; 156/553; 347/171; 33/18.1

[58] Field of Search ..................................... 156/230, 238, 156/239, 241, 247, 289, 250, 251, 257, 350, 353, 358, 359, 268, 344, 510, 540, 543, 553; 33/18.1; 347/171, 215

[56] References Cited

U.S. PATENT DOCUMENTS

| | | | |
|---|---|---|---|
| 4,157,412 | 6/1979 | Deneau | 428/147 |
| 4,374,691 | 2/1983 | Vanden Bergh | 156/234 |
| 4,467,525 | 8/1984 | Logan et al. | 33/18 B |
| 4,645,555 | 2/1987 | Kuboyanna | 156/234 |
| 4,892,602 | 1/1990 | Oike et al. | 156/233 |
| 4,933,124 | 6/1990 | Duncan | 264/22 |
| 5,026,584 | 6/1991 | Logan | 428/41 |
| 5,082,822 | 1/1992 | Uytterhoeven | 503/227 |
| 5,112,423 | 5/1992 | Liebe, Jr. | 156/234 |
| 5,143,576 | 9/1992 | Logan | 156/353 |
| 5,537,135 | 7/1996 | Hevenor et al. | 347/171 |

*Primary Examiner*—Richard Crispino
*Assistant Examiner*—J. A. Lorengo
*Attorney, Agent, or Firm*—McCormick, Paulding & Huber LLP

[57] ABSTRACT

A method and apparatus for making a graphic product from a layer of sheet material on a carrier sheet uses stored machine readable data describing the periphery of the graphic product to cut and remove the product from the carrier sheet. The apparatus includes a feeding mechanism for feeding the layer of sheet material and a bonding web adjacent a thermal heating head. The thermal heating head has individual heating elements that are selectively energized to heat the bonding web throughout a patterned heat application area which overlies the portion of the sheet material corresponding to the weed or the graphic product designated for removal. The portion of the layer of sheet material secured to the bonding web is then separated from the carrier sheet. The apparatus can also be used to apply an adhesive inhibitor to one portion of the sheet material so that another portion can be removed with a conventional adhesive transfer web.

10 Claims, 8 Drawing Sheets

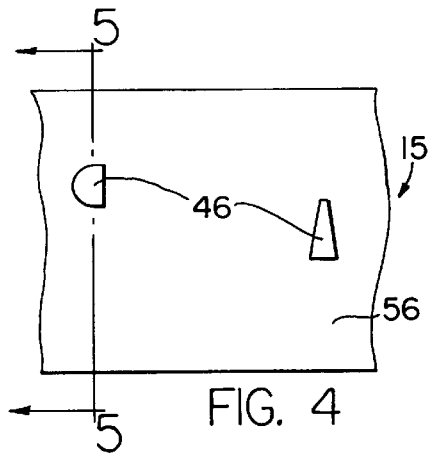
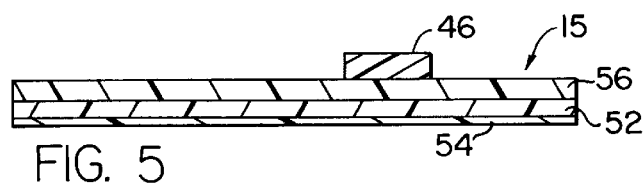
FIG. 4
FIG. 5
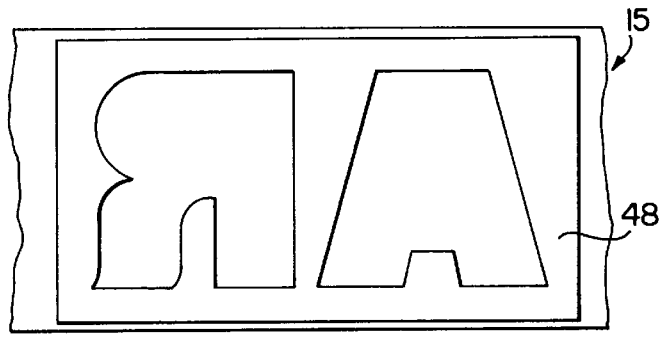
FIG. 6
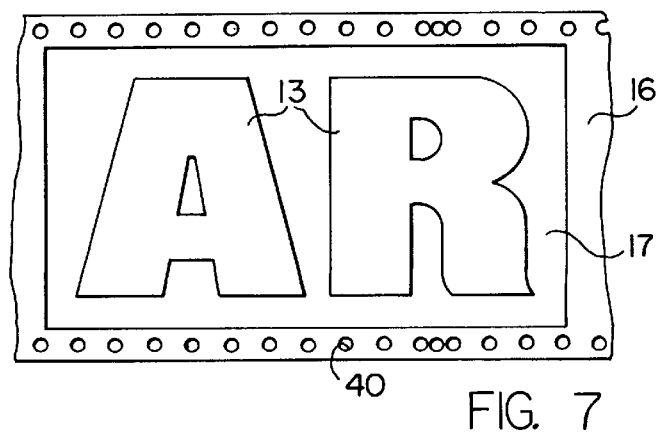
FIG. 7

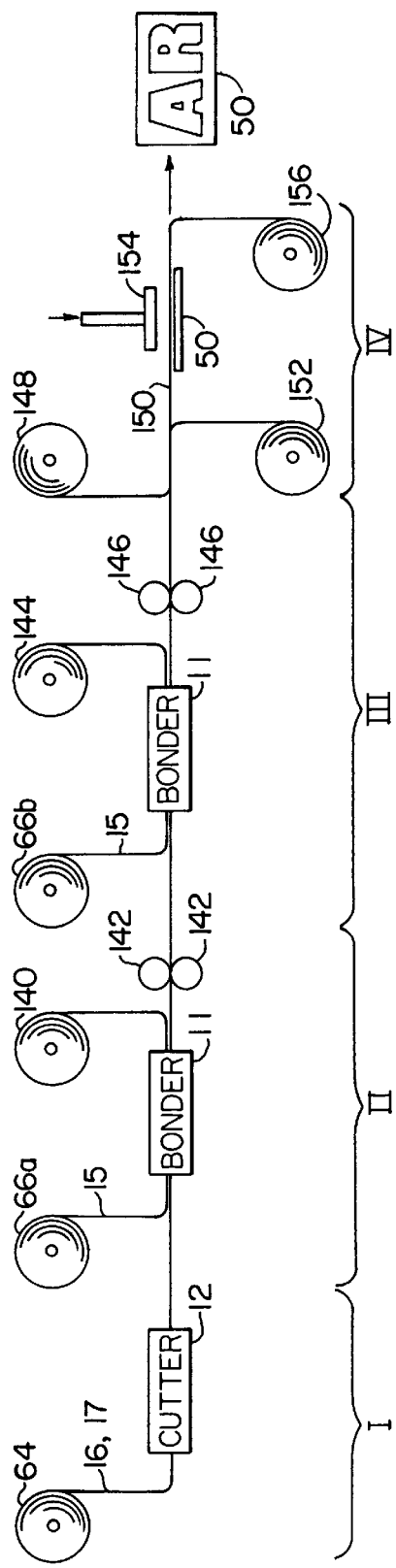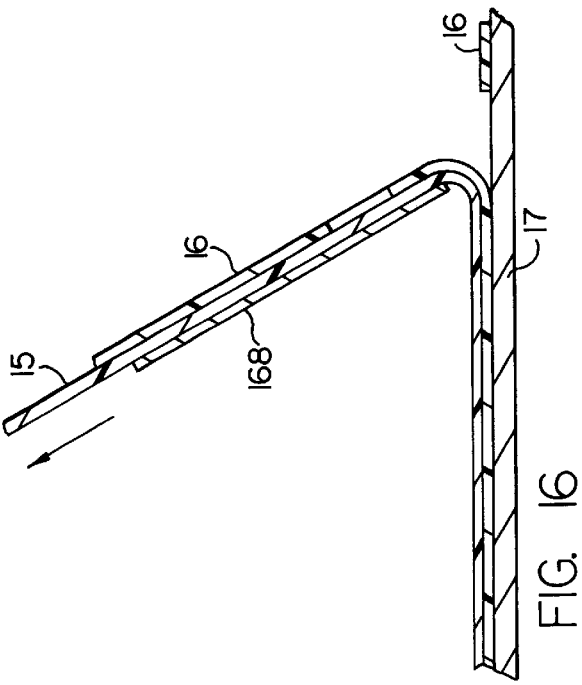

APPARATUS FOR MANUFACTURING A GRAPHIC PRODUCT

This is a divisional of co-pending application Ser. No. 09/009,961 filed on Jan. 21, 1998.

BACKGROUND OF THE INVENTION

This invention relates to a method for manufacturing graphic products such as designs or characters for signs and the like, and an apparatus for performing the method. The types of graphic products to which this invention is directed are characters or designs which adhere to a backing or substrate. The manufacturing of these types of graphic products generally involves the steps of cutting the graphic product from a layer of sheet material on a carrier sheet, removing the product from the carrier sheet and then attaching the product to the substrate.

The present invention is directed to an automated method and apparatus for removing such graphic products from the carrier sheet and includes the selective removal of either the weed interlaced with the product or the graphic product itself. The invention also includes a unique heat activated bonding web for use with the method and apparatus.

The removal of weed and a graphic product, such as a group of spaced letters cut from a layer of sheet material on a carrier sheet for transfer of the product to a substrate, has hitherto been a tedious, time consuming, and usually manually performed job. Frequently, tweezers are used for removing small areas of internal weed such as the center of the letter "A" or "R" from the body of the letter. In addition, the larger external weed, the material surrounding the letter bodies, has also been removed in the same manner. After the weed is removed, the transfer of letters from the carrier sheet to a substrate has been accomplished by manually attaching a transfer web to the graphic product, pulling the web and attached product away from the carrier sheet and placing the web and product into proper position for attachment to a sign substrate. The transfer web is then stripped away from the product. A transfer method and web with a dry activatable adhesive for such purposes is disclosed in U.S. Pat. No. 5,026,584 to Logan, having the same assignee as this invention.

The sign making field includes apparatuses and methods for automated sign making, and includes automatic weeding systems and methods. For example, U.S. Pat. No. 5,143,576 issued on Sep. 1, 1992 to Logan and owned by the assignee of the present invention discloses an apparatus and method for automating weed removal. The apparatus uses stored data in the form of vectors for attaching a bonding web comprising adhesive microcapsules to a graphic product or weed on a carrier sheet along a linear path offset from the periphery of the weed or graphic product In the apparatus, a pressure applicator tool activates the adhesive microcapsules within the web to temporarily bond the web to the graphic product or weed based on the stored data defining the periphery of the graphic product or weed.

The linear nature of the adhesive bond formed by the apparatus in U.S. Pat. No. 5,143,576 omits large portions of the surface area of the graphic product or weed, and thus allows limited or unbalanced forces to be applied to the weed or graphic product upon removal from the carrier sheet with the possibility of tearing the graphic product at the unbonded areas. In contrast, the instant invention bonds the web to substantially the entire surface area of the graphic product or weed, and thus allows the adhesive forces to be distributed throughout the graphic product or weed surface. Moreover, the instant invention is compatible and complementary to automated printing devices and cutters having similar feed mechanisms which have already gained popularity in the sign making industry.

U.S. Pat. No. 4,645,555 to Kuboyama discloses a hot stamping method used for the formation of sharp edged characters and/or numerals in a sheet material attached to a base plate for transfer from the base plate to a substrate. That is, raised numerals or characters are joined to a base plate, and a bonding web including a heat activated adhesive is pressed over the substrate and the numerals or letters. Upon heating the sheet material over its entire surface, the raised characters are joined to an adhesive comprising the sheet, and at the areas where no numerals exist the adhesive remains on the base plate. Therefore, heat is applied over the entire surface of the bonding web and base plate for adherence to the entire base plate surface including the surface of the numeral or character. Unlike the present invention, selective heating is not used for attaching the bonding web to the graphic product alone.

U.S. Pat. No. 4,374,691 to Vanden Bergh discloses a material and method for forming pressure transferable graphic designs. The invention includes a composite material and a method of forming characters or numerals in the composite material and removing the same therefrom for attachment to a substrate. The composite material includes a donor layer for supplying the letters or characters and an accepting layer for receiving the letters and characters. One step involves forming the letters and attaching the letters to the accepting layer. The letters are not preformed in a layer of sheet material on a carrier sheet as in the instant invention. Instead the letters are formed in a layer of sheet material on a carrier sheet by applying heat to the accepting sheet over the desired graphic design formation. The accepting sheet includes an adhesive which is activated upon heating, and during contact with the donor sheet, the adhesive causes sections of the donor sheet to attach to the accepting sheet in configurations resembling the graphic designs drawn. The donor sheet is comprised of a material which is easily fragmented and upon the application of the adhesive, sections matching the graphic designs adhere to the accepting layer. The graphic design may then be removed from the donor sheet and is pressure- or heat- transferred to a sign substrate. Unlike the instant invention, the patent to Vanden Bergh does not incorporate selective activation of a bonding web for registration with, and for joining to precut graphic products.

U.S. Pat. No. 5,112,423 to Liebe Jr. discloses a method of making and applying alignment maintaining plastic lettering material. The method in Liebe uses a composite sheet of material comprising an adhesive layer, a display layer and a release layer. The method includes cutting graphic letters or numerals and the like into the adhesive and display layer but not into the release layer, and stripping away the adhesive and display layers not within the desired outline of the numerals, letters or other graphic product. Accordingly, the release layer is left with the lettering thereon for transfer to a substrate. Unlike the instant invention, selective activation and attachment of a bonding web is not used for removing the symbols or letters from the release layer.

In addition to the above patents using an adhesive for pulling or separating letters or numerals or the surrounding areas from a donor sheet, the art also includes patents directed toward the application of a release layer to a layer of a donor sheet to cause sections of the donor to remain on a carrier sheet while separating other sections. For example, U.S. Pat. No. 4,933,124 to Duncun discloses a process for applying a silicon release coating to a polymer film. The Duncun process includes the application of a release film onto a substrate but the selective automated application of such a film to particular areas of the substrate using a selectively activated head is not disclosed.

As discussed above, the invention also includes a laminated bonding web material having a heat sensitive adhesive and a friction reducing coating thereon for easing the advancement of the web across a heating head in practicing this invention. While U.S. Pat. No. 5,082,822 to Uytterhoeven et al. discloses a die donor element having a coating thereon for easing the passage of a sheet material under a thermal head during printing applications, such a material has not been uncovered with respect to selectively activated adhesive webs as disclosed herein.

The manufacturing and demand for signs comprising letters or designs has become increasingly popular in the sign manufacturing field. In combination with enhanced printing, the resulting graphic products have many applications. With this invention, the removal of graphic products and weed from a carrier sheet by means of a bonding web is no longer a tedious and difficult task. Manual labor including the use of tweezers for removing weed and graphic products from the carrier sheet for transfer of the graphic product to a substrate has been replaced by automation.

Accordingly, one object of this invention is to provide a highly accurate method and apparatus for automated removal of characters and other graphic products or the weed associated therewith from a carrier sheet by selectively attaching a bonding web for convenient transfer of the product to a sign substrate.

A further object of this invention is to provide a method and apparatus for accomplishing automated weeding and graphic product removal without risk of tearing the graphic products.

A still further object of this invention is to provide an automatic weeding and graphic product transfer apparatus and method that are compatible with and complementary to existing successfully marketed sign manufacturing equipment.

SUMMARY OF THE INVENTION

The present invention resides in a method and apparatus for manufacturing a graphic product from a layer of sheet material releasably secured to a carrier sheet for subsequent transfer of the graphic product to a substrate. In this invention, one portion of the layer of sheet material defines the graphic product and is severed from the remaining portions of the layer of sheet material along lines of cut at the peripheral edges of the graphic product. More particularly, the present invention is directed to an automated method and apparatus for selectively securing a bonding web to the portions representing the graphic product or weed associated therewith wherein the portions selectively secured are defined by data in a microprocessor which controls the apparatus.

The method of this invention includes placing a bonding web in overlying relationship with a layer of sheet material with a heat activated adhesive between the bonding web and the layer of sheet material. The bonding web is selectively heated over at least one application area which substantially registers with an underlying one of the portions of the layer of sheet material to activate the adhesive and attach the bonding web to the one of the sheet material portions. Thereafter, the bonding web is pulled to remove the attached portion from the carrier sheet. The attached portion may be either the graphic product portion or the weed portion.

An apparatus for carrying out this method includes storage means for storing data defining the peripheral edges of a graphic product as machine readable data. Feeding means feed the layer of sheet material releasably secured to the carrier sheet and a bonding web having a heat activated adhesive adjacent one side through the apparatus in an overlying relationship adjacent a heating means to activate the adhesive. The heating means is comprised of a plurality of elements positioned in contact with the bonding web and adjacent the layer of sheet material for activating the adhesive. Control means interfaced with the storage means and connected to the heating means causes the elements to be selectively energized in response to the stored data. The elements activate the adhesive in an application area registering with one of the portions of the layer of sheet material while the feeding means feeds the bonding web and layer of sheet material on the carrier sheet relative to the heating means. Accordingly, the bonding web becomes attached to one portion or the other of the layer of sheet material.

In one embodiment of the apparatus for performing the method of the present invention, the storage means is a computer memory which stores the peripheral edges of a graphic product as machine readable data which is downloaded to the control means for selectively activating the heating elements arranged linearly in a thermal head of the heating means. The heating elements attach the bonding web to the sheet material on the carrier sheet when the sheet material is moved past the thermal head by the feeding means. With a different type of web, an adhesive inhibitor can be applied to an application area for subsequent removal of the remaining material via an adhesive transfer web.

The feeding means in one embodiment incorporates belt driven sprockets and a roller platen. The sprockets have pins extending from the peripheries thereof for engaging feed holes extending adjacent the longitudinal edges of the carrier sheet. The sprockets and roller platen move the layer of sheet material, carrier sheet and the overlying bonding web adjacent the heating elements of the thermal head.

Accordingly, the adhesive is activated and the bonding web attaches substantially exclusively to either the graphic product or weed material to be removed from the carrier sheet. If the portion first removed from the carrier sheet is the weed, the remaining portion of the layer of sheet material on the carrier sheet is run through the apparatus a second time, and a second bonding web is selectively attached to the remaining weed or the graphic product on the carrier sheet. When bonding is complete, the bonding web together with the attached weed or product is separated from the carrier sheet. The bonding web or an adhesive transfer web attached to the graphic product is used to transfer the graphic product to a graphic product substrate.

In one embodiment, the layer of sheet material attached to the carrier sheet and the bonding web are supplied by the feed means from separate rolls rotatably mounted on the apparatus.

As a result of the invention, weed or graphic products used for making signs can be removed from a carrier sheet via an automated apparatus and method.

BRIEF DESCRIPTION OF THE DRAWINGS

FIG. 4 is a fragmentary view of a bonding web with internal weed attached thereto after weeding the graphic product in FIG. 2.

FIG. 5 is an enlarged cross-sectional view of the bonding web taken along line 5—5 of FIG. 4.

FIG. 6 is a fragmentary view of another bonding web with external weed attached thereto after weeding the product in FIG. 2.

FIG. 7 is a fragmentary view of a graphic product on the carrier sheet after all the weed has been removed from the carrier sheet.

FIG. 15 is a schematic diagram of a combined cutting, bonding and separating process in accordance with the present invention.

FIG. 16 is a fragmentary sectional view of the process in FIG. 15 for separating a bonding web having an attached weed portion or graphic product from a carrier sheet.

DETAILED DESCRIPTION OF THE PREFERRED EMBODIMENTS

Figure 1:
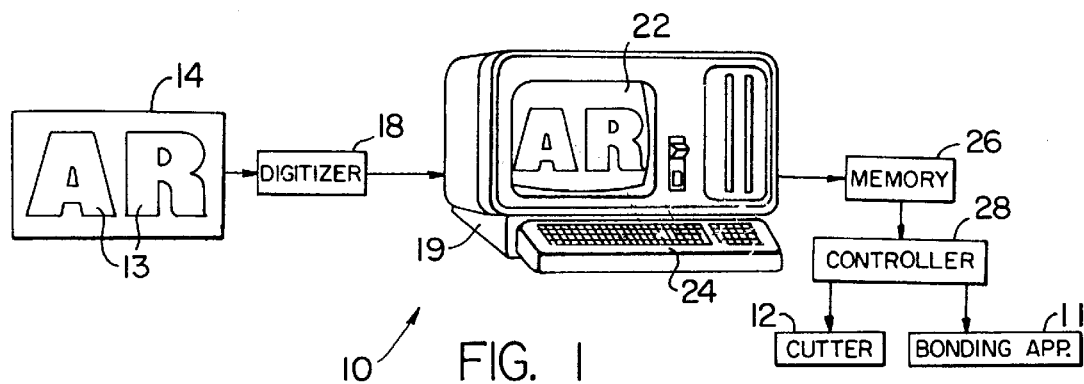
FIG. 1 is a schematic diagram illustrating a system for cutting a graphic product in a layer of sheet material on a carrier sheet and separating the product from the carrier sheet in accordance with the present invention.

FIG. 1 illustrates a microprocessor controlled system, generally designated 10, which controls a bonding apparatus 11 as well as a cutter 12 to manufacture a graphic product in accordance with the present invention. The cutter 12 cuts a graphic product, such as the letters "AR" of a sign or logo from a layer of sheet material releasably secured to a carrier sheet. Based on data 14 input into the system, the bonding apparatus 11 selectively bonds a bonding web to a designated portion of the cut layer of sheet material for subsequent separation and removal of the portion from the carrier sheet.

Figure 2:
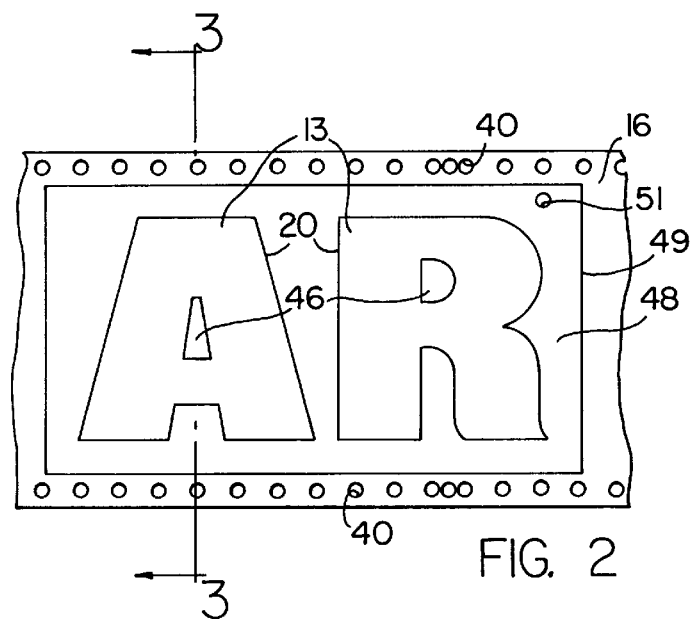
FIG. 2 is a fragmentary view of a graphic product cut in a layer of sheet material on a carrier sheet having feed holes extending longitudinally along each edge.

The system 10 includes a digitizer 18 for converting graphic data 14 into machine readable data for storage and use by a microprocessor-based computer 19. The machine readable data includes parameters defining the interior and exterior peripheral edges 20 of the graphic product 13 as shown in FIG. 2. The data defining the peripheral edges is displayed on a monitor 22 in the form a graphic image. The graphic image may be altered by inputting further information into the computer 19 through a keyboard 24 or the like.

Along with the cutting process and the bonding process disclosed herein, a printing process may be included is a step prior to cutting. Moreover, an enhancement program may be included in the system so as to change the graphic image through the printing of shading, halftones and colors as described in greater detail in U.S. patent application Ser. No. 08/007,662, filed Jan. 22, 1993, now U.S. Pat. No. 5,537,155, and having the same assignee. The system is open to a variety of different software programs and the like for altering the graphic images manufactured.

An operating program in the computer 19 interprets the machine readable data and runs a variety of operations from the computer, including the operation of the cutter 12, and the bonding apparatus 11. The computer 19 generates cutting, bonding and possibly printing programs from the machine readable data, and the programs are stored in a memory 26 and read by the controller 28 of FIG. 1. Thus, the controller 28 operates both the cutter 12 and the bonding apparatus 11, and if desired, a printer, based on the graphic data 14 input into the system 10. A suitable cutter 12 for carrying out the cutting operation, is described in U.S. Pat. Nos. 4,467,525; 4,799,172 and 4,834,276, all owned by the assignee of the present application.

Figure 3:
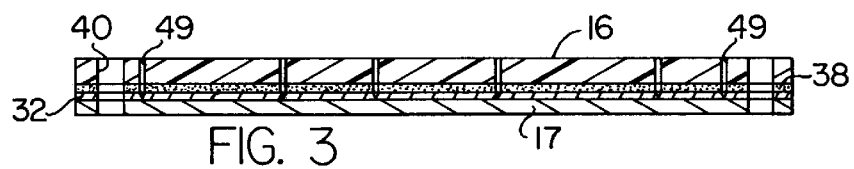
FIG. 3 is an enlarged cross-sectional view of the sheet material on the carrier sheet as viewed along line 3—3 of FIG. 2.

Based on the machine readable data, the cutter cuts a path defining the peripheral edges 20 of the graphic product 13 in a layer of sheet material 16 which is releasably secured to a carrier sheet 17 as shown in FIGS. 2 and 3. The layer of sheet material 16 is preferably formed from vinyl and the carrier sheet 17, which is not cut, is formed from heavy paper or tag board. As shown in FIG. 3, the vinyl layer 16 is releasably attached to the carrier sheet 17 via a pressure sensitive adhesive 38. The carrier sheet 17 is coated with a release agent 32 so that only a temporary bond holds the vinyl layer 16 on the carrier sheet 17. The vinyl layer 16 in one form is HP220 Scotchcal vinyl sheet manufactured by the 3M Corporation. The strip formed by the vinyl layer and the carrier sheet has a row of feed holes 40 extending along each longitudinal edge of the strip for feeding the strip through the cutter 12 and bonding apparatus 11 of FIG. 1

When the graphic product is cut into the vinyl layer 16, the material is divided into two portions, the graphic product 13 and the weed. The graphic product 13 consists of the letters "AR" and the weed is the remainder including the internal weed 46 defined by the internal peripheries or edges of the graphic product, and the external weed 48 outside the external peripheries of the graphic product. A border 49 may be cut around the graphic product to define the outer limit of the external weed 48 and to ease removal of the external weed from the carrier sheet 17. The cut border is advantageous, but not required.

In addition to cutting the graphic product 13 as described above, a registration circle 51 is also cut into the layer of sheet material 16 as shown in FIG. 2. The circle 51 is cut adjacent one of the feed holes 40 along the longitudinal edges of the strip and is used to identify and properly locate the origin of the graphic product in the bonding apparatus 11 after it emerges from the cutter 12.

Figure 8:
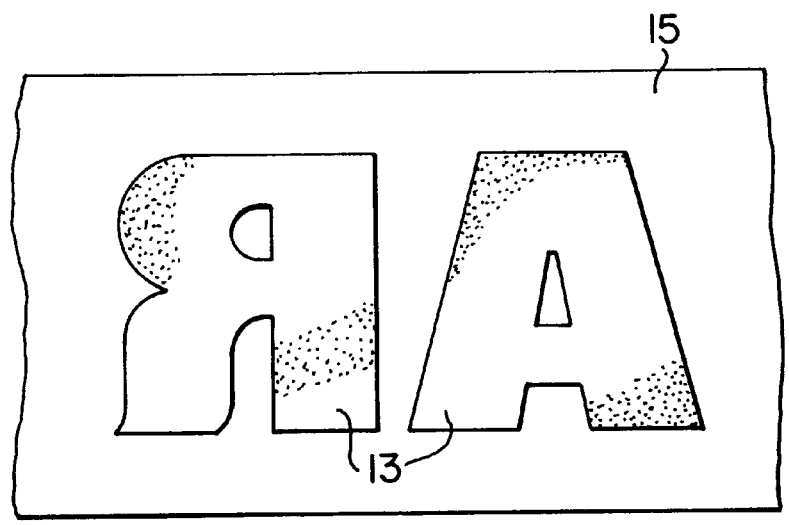
FIG. 8 is a fragmentary view of still another bonding web used in a graphic product transfer process with the graphic product attached thereto.

In the process of removing the graphic product 13 from the carrier sheet and transferring the graphic product to a signboard or other substrate, the bonding apparatus 11 of FIG. 1 selectively attaches a bonding web by means of a heat activated adhesive to the cut portions of the vinyl layer 16. Generally a bonding web 15 is first attached to the internal weed 46, and the weed is removed from the carrier sheet by pulling the bonding web 15 and the carrier sheet apart with the internal weed clinging to the bonding web as shown in FIG. 4. Then another bonding web 15 is attached to the external weed 48 and the external weed is removed from the carrier sheet by the bonding web as shown in FIG. 6. At this stage the graphic product 13 "AR" remains alone on the carrier sheet 17 within the border as shown in FIG. 7. Finally another bonding web 15 is attached to the graphic product "AR", and the product is then removed from the carrier sheet with the web as shown in FIG. 8 and placed on a sign substrate. The pressure sensitive adhesive 38 (FIG. 3) stays with the vinyl of the graphic product 13 rather than the carrier sheet 17 because of the release agent 32, and is used to secure the product to the substrate.

If the product is suitably shaped and weed portions 46,48 are large enough, it is possible to omit the steps of removing the weed, and to attach a bonding web initially to the product 13 for removal from the carrier sheet in a single step. Preferably a two step process is used in which the internal weed is first removed from the carrier sheet with a first bonding strip, and the graphic product is then removed with a second bonding strip to leave the external weed on the carrier sheet.

In one embodiment a bonding web 15 with the adhesive forming an integral part thereof, as shown in FIGS. 4 and 5, is comprised of two layers of material. A first layer 52 is formed from a biaxially oriented polyester having a melting temperature of approximately 300° F. The layer is coated with a friction-reducing material 54 to ease advancement of the bonding web adjacent heating elements in the bonding apparatus 11 as described below. The material 54 may be a silicon based material. A second layer 56 of the web 15 is secured to the first layer 52 and is comprised of polyethylene, polypropylene or a polyurethane or other similar material having a melting temperature of approximately 225° F. to form a high tack releasable adhesive upon heating. During heating in the bonding apparatus 11, the first layer 52 maintains its structural integrity while the second layer 56 melts and forms an adhesive to attach the web 15 to a selected portion of the cut vinyl layer 16. Alternately, a single layer of polyester can be coated with a heat activated dry adhesive for attaching the bonding web to the weed or product portions, or a heat activated adhesive can be interposed between the sheet material and web in a separate step.

Figure 9:
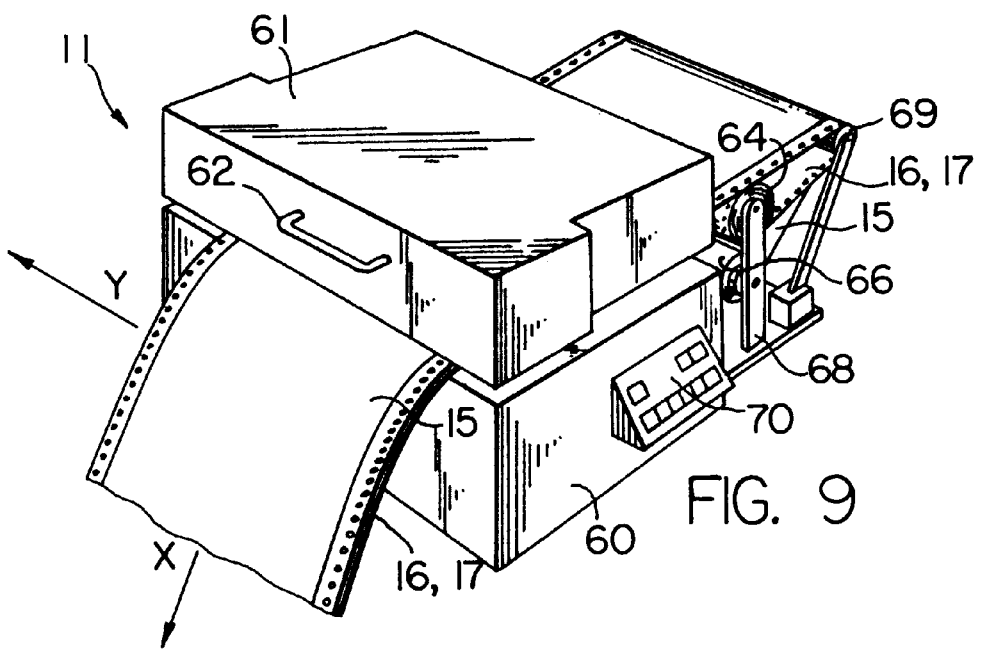
FIG. 9 is a perspective view of a bonding apparatus used in the system of FIG. 1.

An embodiment of the bonding apparatus 11 for carrying out the selective bonding operation using the bonding web 15 is described in further detail below and is illustrated in FIG. 9. The bonding apparatus 11 has an outer shell or housing 60 to which the components of the bonding apparatus are attached. The housing is comprised of a hinged cover 61 which has a handle 62 for assisting in opening the cover to expose the internal mechanism. Rolls 64,66 may be used for supplying the strip consisting of the now-cut vinyl layer 16 on the carrier sheet 17 and the bonding web 15, respectively, into the bonding apparatus, and are rotatably mounted in a rack 68 at the rear of the apparatus. The strip and the bonding web 15 are fed from the separate rolls over a dancer roller 69 into the bonding apparatus 11 in overlying relationship, and exit the bonding apparatus 11 at the front side of the machine as shown in FIG. 9. They may be retrieved as desired including, for example, manual retrieval or retrieval via take-up rolls. As an alternative to supplying the bonding web 15 from the roll 64, the web may be manually supplied by opening the cover 61 and placing the web in an overlying manner on the vinyl layer 16. With this alternative, however, the layer is preferably still fed from the roll 64.

Although the bonding apparatus is automatically controlled from the controller 28, the bonding apparatus also has an additional control panel 70 accessible from outside of the apparatus as shown in FIG. 9 to allow an operator to manually control the feeding and bonding operation.

As shown in FIGS. 10–14, the bonding apparatus has a feed mechanism for advancing the strip of cut vinyl material on the carrier sheet 17 and the bonding web 15 through the bonding apparatus relative to a thermal head 101 which bonds the web 15 selectively to the vinyl layer 16. The feed mechanism includes two driven sprockets 72,74 having a plurality of equally spaced pins 76 extending from and around the periphery of the sprockets, as shown most clearly in FIGS. 10 and 12. The pins engage the rows of feed holes 40 extending along both longitudinal edges of the strip. For a more complete description of how the feed holes and drive sprockets are arranged and cooperate to align and position the strip, reference may be had to U.S. Pat. No. 4,834,276.

Figure 11:
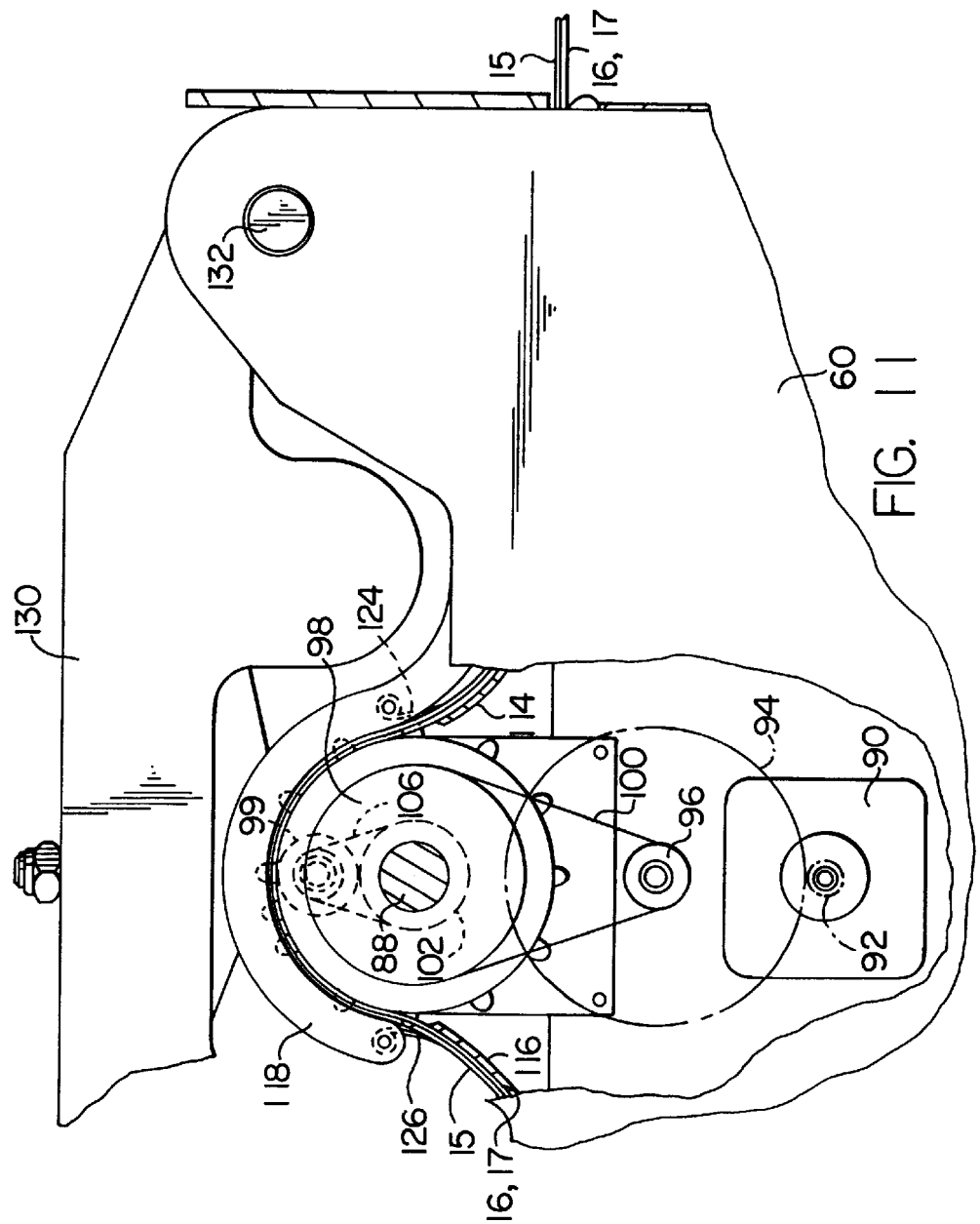
FIG. 11 is an enlarged fragmentary view of the bonding apparatus in FIG. 10 and shows a feed mechanism for moving the bonding web and layer of sheet material on a carrier sheet through the bonding apparatus.
Figure 12:
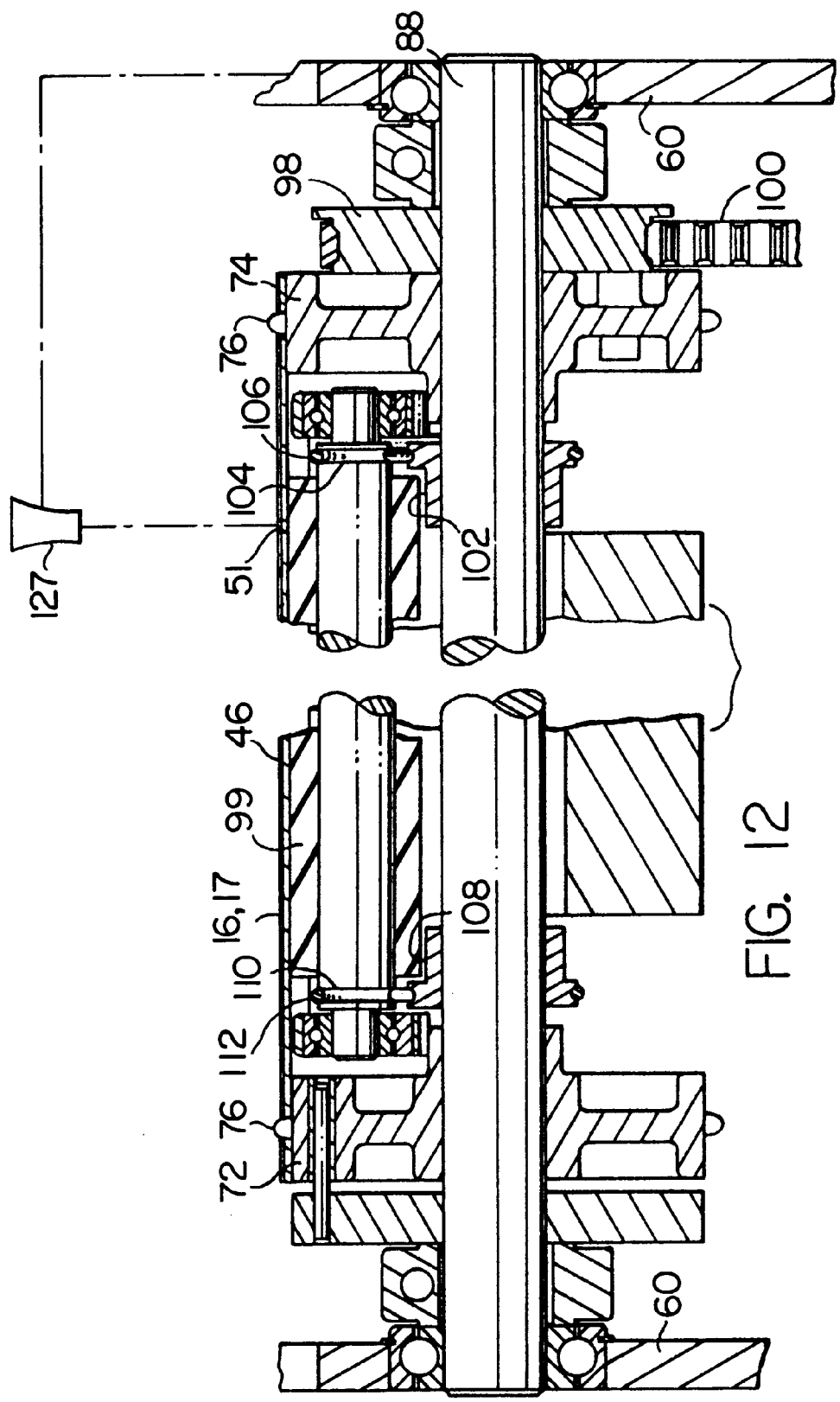
FIG. 12 is a fragmentary front view showing a support structure and drive mechanism for a roller platen and drive sprockets in the bonding apparatus.

As shown in FIGS. 11 and 12, the drive sprockets 72,74 are fixedly mounted to a drive shaft 88, which is rotatably mounted within the housing 60 of the bonding apparatus and driven by a stepmotor 90 shown in FIG. 11 through a series of drive gears 92,94, two drive pulleys 96,98 and a toothed drive belt 100. In addition, a roller platen 99 is also rotatably mounted within the housing 60 and is driven from the drive shaft 88 by means of drive pulleys 102,104 and an O-ring drive belt 106 at one end of the platen and drive pulleys 108,110 and an O-ring drive belt 112 at the opposite end of the platen. The gears, toothed drive belt and sprockets insure that the bonding web 15 and vinyl layer 16 on the carrier sheet 17 are precisely positioned on the roller platen 99 under the thermal head 101. In addition, they control the speed at which the vinyl layer 16 on the carrier sheet 17 and bonding web 15 move through the bonding apparatus.

Figure 10:
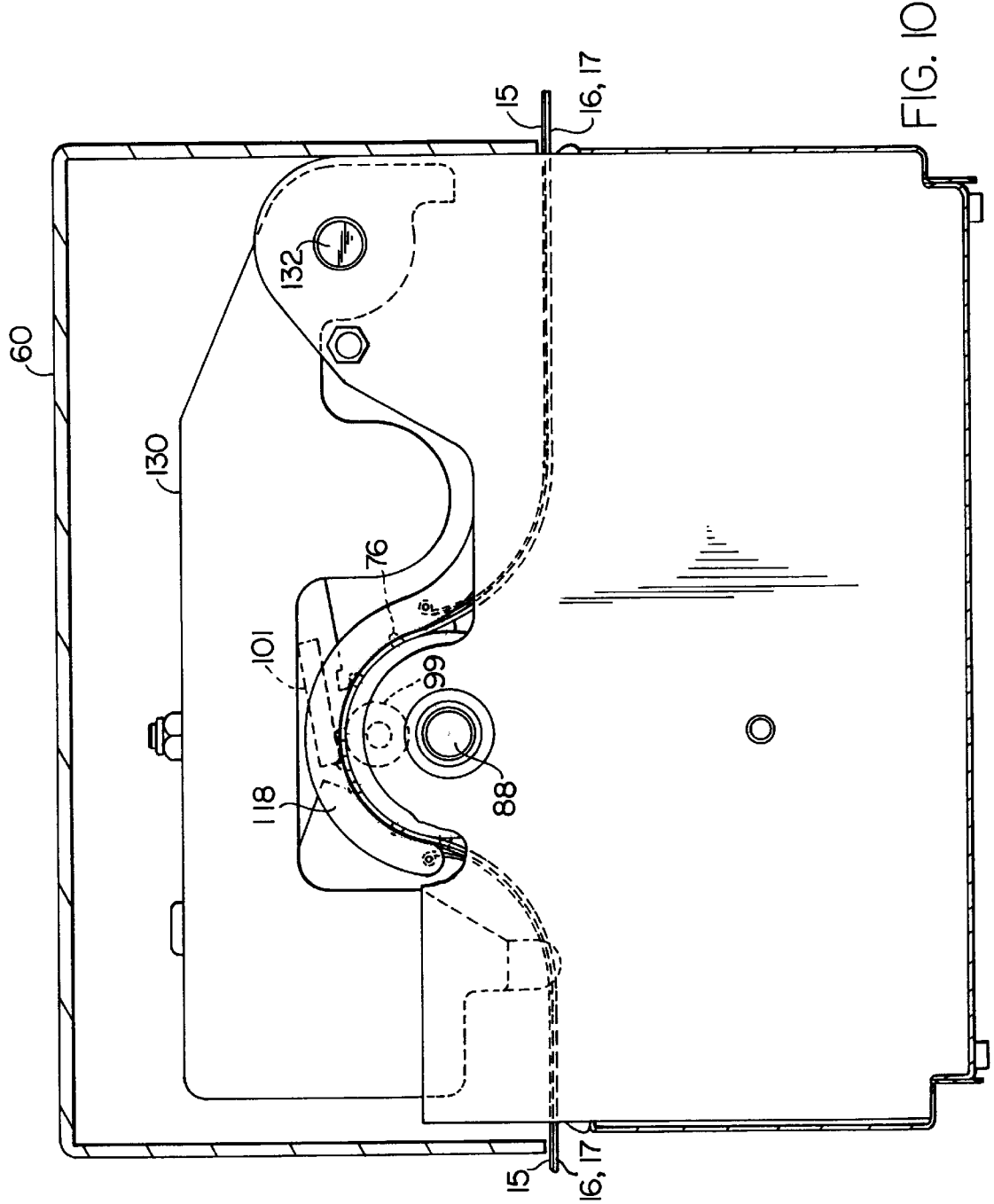
FIG. 10 is a side elevation view of the interior of the bonding apparatus.
Figure 14:
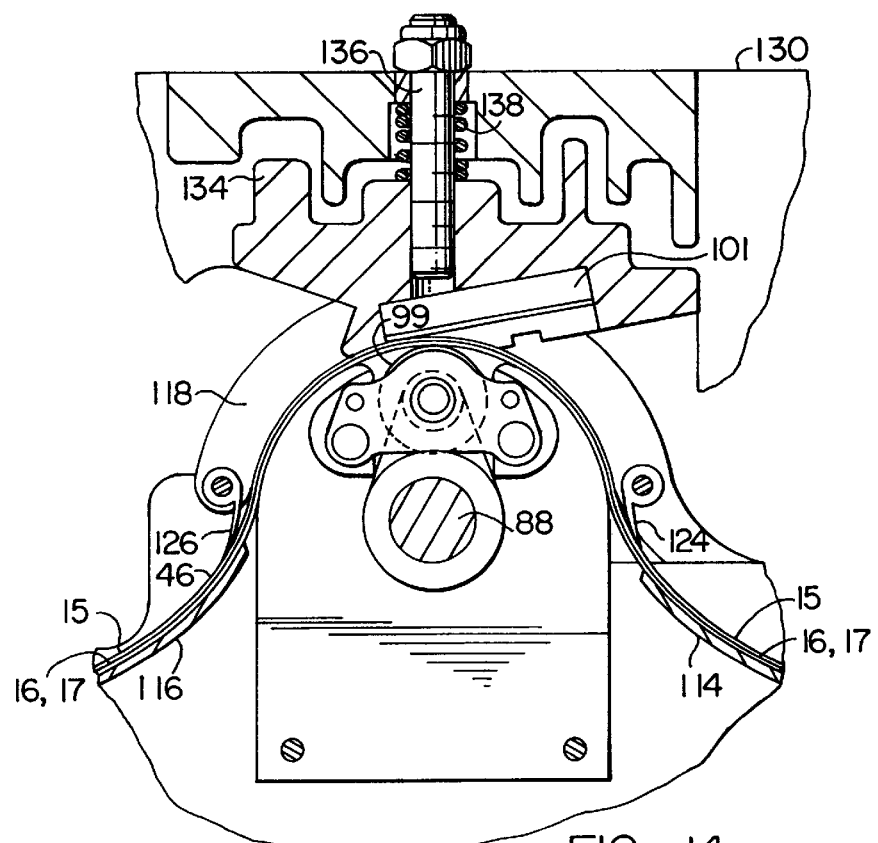
FIG. 14 is an enlarged fragmentary view of the apparatus, similar to FIG. 11, and shows the thermal head, roller platen and drive sprockets.

The drive pulleys 102,104,108,110 are selected to establish a peripheral speed of the roller platen 99 that is slightly higher than the peripheral speed of the drive sprockets 72,74 to assist the feeding of the vinyl layer 16 on the carrier sheet and the bonding web 15 past the thermal head 101 shown in FIGS. 10 and 14. Since the drive sprockets 72,74 positively engage the layer of sheet material 16 on the carrier sheet 17 and control the speed of the sheet, the O-ring drive belts 106,112 must allow limited slip to prevent tearing.

Figure 13:
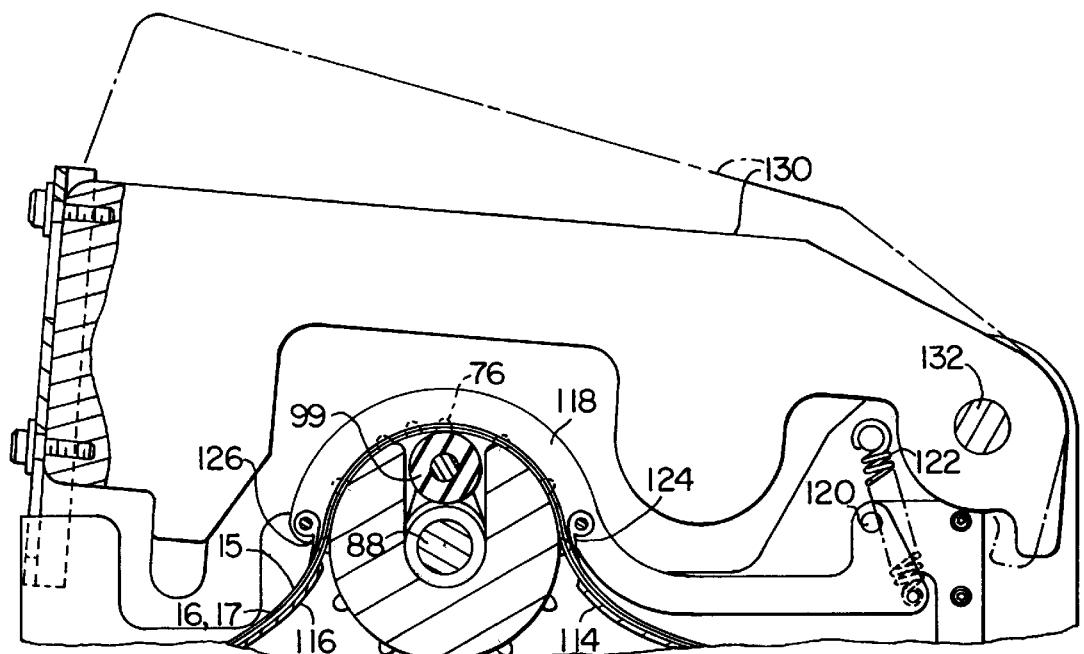
FIG. 13 is another side elevation view showing an open and closed position of the upper frame of the bonding apparatus.

As shown clearly in FIGS. 13 and 14, a pair of curved, sheet metal plates 114,116 guide the bonding web 15 and the vinyl layer 16 on the carrier sheet 17 circumaxially onto and off of the roller platen 99 and each of the cylindrical support surfaces of the sprockets 72,74 in a U-shaped feed path. The cylindrical surfaces of the sprockets lie in a cylindrical plane much larger in diameter than the cylindrical, strip-engaging surface of the roller platen 99 which is tangential to the cylindrical plane. Preferably, the cylindrical surface of the roller platen 99 is formed by a hard rubber sleeve which improves the frictional engagement of the platen with the carrier sheet 17.

Referring still to FIG. 13, in order to keep the bonding web 15 and vinyl layer 16 and the carrier sheet 17 fully engaged with approximately 180° of the sprockets 72,74, a pair of holddown bales 118 (only one shown) support two holddown wipers 124, 126 at the supply and discharge points of the sprockets. The bales are pivotally suspended from the housing 60 on pins 120 as indicated in FIG. 13, so that the bails and wipers can be lifted away from the sprockets and allow the bonding web 15 and vinyl layer 16 on the carrier sheet 17 to be mounted on and removed from the sprockets and roller platen 99. Overcenter springs 122 are connected to the housing adjacent the pivotal ends of the holddown bales and assist in holding the wipers down on the vinyl layer 16 on the carrier sheet 17 and bonding web 15.

As shown in FIG. 13, an optical sight 127 supported from the housing 60 of the bonding apparatus can be temporarily swiveled over the roller platen 99 to accurately locate the origin circle 51 (FIG. 2) of the graphic product cut into the vinyl layer 16 and bring that origin into registration with the origin of the corresponding bonding program controlling the operation of the bonding apparatus 11. It will be understood that the cutting program which guides the cutter 12 (FIG. 1) and the bonding program which operates the bonding apparatus 11 use the same data defining the peripheral edges of the graphic product 13 so that the bonding web 15 is accurately bonded to either the weed or the graphic product created by the cutting program. Correlation of the cutting and bonding programs on the material is brought about by starting both operations at the registration circle 51 or origin in the vinyl layer.

Thus, the vinyl layer 16 and underlying carrier sheet are first positioned on the sprockets 72,74 and the sprockets are slewed by the operator of the bonding apparatus until the registration circle 51 is centered in the optical sight 127. The temporary position of the optical sight is in a vertical plane directly above the center of the roller platen 99 at a known position offset from the sprocket pins 76. Once the registration circle is properly located, the bonding operation can be started with assurance that the cut pattern defining the graphic product in the vinyl layer 16 is in proper registration with the programmed bonding pattern that joins the web 15 to selected portions of the vinyl.

FIG. 14 illustrates the layer of sheet material 16 on the carrier sheet 17 and bonding web 15 passing over the roller platen 99 relative to and adjacent the thermal head 101. The thermal head is similar to thermal printing heads used in printing operations such as that disclosed in U.S. patent application Ser. No. 08/007,662, filed Jan. 22, 1993 and owned by the Assignee of this application. However, unlike printing heads, no printing ribbon or web is used with the thermal head 101 in this invention.

The thermal head 101 has a plurality of heating elements distributed evenly along the head from one end of the roller platen 99 to the other and the heating elements are densely packed along a line of contact with the head, preferably with a density of 300 elements per inch. One such head is made by Kyocera Industrial Ceramics Incorporated of Kyocera, Japan. The elements can be energized individually to selectively activate the heat-activated adhesive layer of the bonding web 15 and thereby attach the web to the weed or graphic product portion of the vinyl layer 16.

Referring generally to FIG. 14, the thermal head 101 is mounted in the upper support frame 130 pivotally supported in the housing 60 by a shaft 132. A suspension plate 134 is connected with the frame 130 by means of a series of bolts 136 which are secured to the plate 134 and slidably received within the frame 130 so the plate 134 together with the thermal head 101 can move vertically relative to the support frame. In addition to supporting the thermal head 101, the mounting plate 134 also serves as a heat sink for the heat generated in the thermal head. Surrounding each of the sliding bolts 136 and interposed between the frame 130 and plate 134 are several coil springs 138 which, with the support frame lowered and latched in the closed position as shown in FIGS. 10 and 14, apply pressure downwardly on the plate 134 and press the thermal head 101 against the bonding web 15 and vinyl layer 16 on the carrier sheet 17 and the roller platen 99 along a line of contact extending horizontally at the roller platen.

After cutting and loading the strip of cut vinyl and carrier sheet and the bonding web into the bonding apparatus, the bonding and separating operations can proceed. The cut vinyl layer 16 on the carrier sheet 17 and bonding web 15 are fed in overlying relationship over the roller platen and under the thermal head, as shown in FIG. 14.

Based on the bonding program developed from the input data 14 (FIG. 1) defining the graphic product, the heating elements of the thermal head 101 are energized in a pattern substantially registering with either the graphic product portion or weed portion cut into the vinyl layer 16. Using the keyboard 24 (FIG. 1), either of the portions can be selected for bonding to the web 15 and subsequent removal from the carrier sheet 17. Accordingly, if the internal weed 46 shown in FIG. 2 is selected for removal, the heating elements are selectively energized at different parts of the thermal head 101 at selected times and for given durations as the web 15 and vinyl layer 16 move under the head to attach the web to the vinyl in an application area or pattern registering in position and shape with all or substantially all of the internal weed.

In particular the heating elements may be energized over the weed in solid pattern or in other patterns matching the shape of the weed. To save energy or eliminate overheating, the elements and the adhesive of the bonding web can be activated in a plurality of discrete, evenly spaced zones, such as in a striped or checkered board pattern which terminates at the edges of the weed portion and covers the entire portion.

Thus, upon movement of the vinyl layer 16 and bonding web 15 adjacent the thermal head 101, the bonding web 15 is heated over an application area matching the patterns cut in the vinyl, i.e. the shape of the internal weed or sections of internal weed designated for removal from the carrier sheet, and the adhesive formed by the bottom layer of the bonding web is activated in a pattern and attaches the web to the internal weed. With the high density heating elements, the selected portion of the cut vinyl is precisely bonded to the bonding web 15 for subsequent lifting and separation from the graphic product and weed portions which remain secured to the carrier sheet 17. In addition to activating the heat sensitive adhesive of the bonding web, the thermal head also heats the pressure sensitive adhesive between the vinyl and the carrier sheet to assist in loosening the attached portions from the carrier sheet 17.

When the bonding web 15 and vinyl layer 16 on the carrier sheet 17 are discharged from the bonding apparatus 11, the bonding web 15 and the internal weed attached to it are pulled and separated from the carrier sheet 17. FIG. 4 is indicative of the results of separation, and shows the internal weed 46 attached to the bonding web 15.

In a similar manner and if necessary or desired, the external weed 48 (FIG. 2) is removed from the carrier sheet 17 by passing the cut vinyl layer 16 on the carrier sheet through the bonding apparatus 11 a second time with a second bonding web 15. The process of external weed removal is similar to that described above for the internal weed except that the heating elements are energized over an application area or pattern substantially registering in position and shape with the external weed 48. The second bonding web and attached weed are then separated from the carrier sheet and appear as shown in FIG. 6.

With the internal and external weed removed, the only portion of the vinyl layer 16 left on the carrier sheet 17 within the frame is the graphic product 13 as shown in FIG. 7. The graphic product can now be removed in the same manner as the weed portions by processing the vinyl layer and carrier sheet with a third bonding web through the bonding apparatus 11, and energizing the thermal head to heat the bonding web in a pattern corresponding to the product. The product is then lifted from the carrier sheet and is transferred on the bonding web to a sign substrate for attachment.

Alternatively and if the internal and external weed have been removed, the graphic product can be transferred to a sign substrate by pressing an adhesive transfer web against the product to establish a temporary bond for stripping the product from the carrier sheet. This process is described in U.S. Pat. No. 4,467,525.

Whether a bonding web or a transfer web is used, the pressure sensitive adhesive joining the vinyl to the carrier sheet stays with the graphic product during stripping due to the release coating on the carrier sheet. Since the pressure sensitive adhesive establishes a stronger bond with a sign substrate than the temporary bond with the transfer or bonding web, the adhesive will secure the graphic product to the substrate and allow the web to be stripped away.

In some cases, the external weed does not have to be removed from the carrier sheet before the graphic product. With products having large and simple or less intricate weed portions, the cut vinyl layer 16 on the carrier sheet 17 and an overlying bonding web can be processed through the bonding apparatus 11 as described immediately above to join the product to the bonding web without first removing any of the weed. The graphic product portion is designated for removal via the keyboard 24 in FIG. 1. The controller 28 causes the heating elements of the thermal head to energize and activate the heat-activated adhesive of the web in an application area corresponding in position and shape with the graphic product.

The bonds formed by the various combinations of materials and adhesives must necessarily be stronger or weaker relative to each other. For example, the strength of the temporary bond between the carrier sheet 17 and graphic product 13 in the vinyl layer 16 must be less than the strength of the bond formed between the bonding web 15 and the graphic product so as to accomplish the separation of the graphic product from the carrier sheet 17. These same relative strengths are also necessary for the separation of the weed portion from the carrier sheet. However, when separation has been completed and the graphic product is to be attached to the sign substrate, the resulting bond by the pressure sensitive adhesive must be stronger than the bond formed between the bonding web 15 and the graphic product. That is, the pressure sensitive adhesive 38 must form a bond with the non release coated substrate stronger than the bond between the graphic product and the bonding web 15.

The combinations of adhesives and substrates which are effective in performing the methods of bonding and separation described above are listed in Table 1 below. Table 1 indicates

TABLE 1

SHEET MATERIAL CHARACTERISTICS

| ELEMENT | MATERIAL | THICKNESS (in.) |
| --- | --- | --- |
| Bonding Web - Bottom Adhesive Layer (56) | Polyethylene | .0008 |
| Bonding Web - | Polyester | .0005 |

TABLE 1-continued

| Top Layer (52) Layer of Sheet Material (16) | Vinyl | .002 |
| --- | --- | --- |
| Carrier Sheet (17) | Paper | .003 |

RELATIVE ADHESIVE STRENGTHS

| ELEMENT | MATERIAL | SUBSTRATES ADHERED | PEEL STRENGTH lb/in |
| --- | --- | --- | --- |
| Adhesive (38) | Pressure Sensitive Adhesive | HP220 Scotchcal vinyl and Carrier with Release Agent | 1.50 |
| Adhesive (38) | Pressure Sensitive Adhesive | HP220 Scotchcal vinyl and Plastic Sign Substrate | 2.44 |
| Bottom Layer (56) | Heat Activated Polyethylene Adhesive | HP220 Scotchcal and Polyethylene | 1.75 | that when the graphic product portion or weed portion of the layer 16 consisting of HP220 Scotchcal vinyl is joined with the polyethylene of the bonding web 15 by the thermal head 101 as discussed above, a bond having an adhesive strength of 1.75 lb./in is exhibited. This strength has been found to be highly effective in overcoming the temporary bond between the HP220 Scotchcal vinyl and the carrier sheet of approximately 1.5 lb./in or less. This 1.5 lb./in. bond is weak enough to allow the 1.75 lb./in. bond between the graphic product or weed and the bonding web 15 to be maintained during stripping from the carrier sheet. On the other hand, the bond strength between a non-release coated plastic, when used for the sign substrate 50, and the HP220 Scotchcal vinyl portions coated with the pressure sensitive adhesive is 2.42 lb./in. This bond is strong enough to overcome the 1.75 lb./in. bond between the graphic product and the bonding web, and thus permits separation of the vinyl material from the bonding web.

While the present invention has been described in a preferred embodiment, it should be understood that numerous modifications and substitutions can be had without departing from the spirit of this invention.

For example, although the cutting, bonding and separating operations described above have been performed as separate operations in the cutter 12 and bonding apparatus 11 in FIG. 1, the entire sign making process including weeding can be performed continuously in a fully automatic, integrated system as illustrated in FIG. 15. The system has four stages: a cutting stage I, a bonding stage II, a bonding stage III and a transfer stage IV. In stage I the cutter 12 cuts the graphic product in the vinyl layer 16 on the carrier sheet 17 as previously described. However the cut vinyl layer on the carrier sheet is processed from the output of the cutter directly to the input of a first bonding apparatus 11 in stage II where a first bonding web 15 from supply spool 66a is overlaid on the cut vinyl for selective attachment, for example, to the internal weed. At the output of the first bonding apparatus, the bonding web with attached weed is stripped from the rest of the cut vinyl by a take-up spool 140, and the carrier sheet with the remaining vinyl is processed directly to the input of a second bonding apparatus 11 in stage III by means of feed sprockets 142. In stage m another bonding web 15 from a supply spool 66b is overlaid on the cut vinyl for selective attachment, for example, to the external weed. At the output of the second bonding apparatus, the bonding web with the attached weed is stripped from the rest of the vinyl by a take-up spool 144, and the carrier sheet and now-weeded graphic product are processed directly to the input of a transfer device in stage IV by the feed sprockets 146. In stage IV a transfer web 150 from spool 148 lifts the graphic product from the carrier sheet which is reeled onto a take-up spool 152 while the graphic product is transferred by the transfer web 150 to a sign substrate 50 where a press 154 applies the graphic product to the substrate to produce the finished sign. The transfer sheet 150 is taken up on spool 156.

When the carrier sheet 17 and bonding webs 15 are separated at the output stages II and III as discussed above, the most effective method of separation is by pulling the web from the carrier at an angle of 120° as shown in FIG. 16. In addition to the 120° angle, it is desirable that a small radius be maintained at the point where the bonding web 15 is bent for the separation. By using a backing plate 168 adjacent the inside radius formed by the bending of the bonding web, as shown in FIG. 16, good release and separation may be obtained. The plate 168 allows a small radius to be maintained at the bend point of the bonding web during the separation process and assists as well as in maintaining a constant pressure on the web.

The bonding apparatus 11 can also be employed in a further weeding operation in which a heat-activated release material or adhesive inhibitor is transferred from a carrier web onto the cut vinyl layer 16 in a selected pattern corresponding to the weed. For example, a supply web bearing a heat-releasable silicone or grease is overlaid on the cut vinyl layer 16 and the carrier sheet 17, and the materials so laminated are fed through the bonding apparatus in the same manner as the bonding web overlaid on the cut vinyl layer. In this instance the key board 24 in FIG. 1 calls up the pattern corresponding to the weed to energize the thermal head and cause the heat-activated adhesive inhibitor to be released from the supply web and be deposited on the weed portion only of the vinyl. When the vinyl layer 16 with the inhibitor material is discharged from the bonding apparatus, the supply web is removed from the vinyl and a transfer sheet with pressure sensitive adhesive is applied to the graphic product portion of the vinyl to strip the graphic product from the carrier sheet and the remaining vinyl on the sheet. The adhesive inhibitor overlying the weed portion of the vinyl prevents the transfer web from adhering and, thus, permits the graphic product to be lifted away from the carrier sheet for transfer to a sign substrate.

As an alternative to feeding the adhesive inhibiting web from an exterior spool, the inhibiting web may be supplied in cassette format. The description of the cassette format is incorporated herein by reference to application Ser. No. 08/007,602, filed Jan. 22, 1993 and owned by the Assignee of the present invention.

Accordingly, the present invention has been described in several preferred embodiments by way of illustration rather than limitation.

I claim:

1. An apparatus for manufacturing a graphic product from a layer of sheet material releasably secured to a carrier sheet, one portion of the layer of sheet material defining a graphic product being severable from remaining weed portions of the layer of sheet material on the carrier sheet along lines of cut at the peripheral edges of the graphic product, said apparatus comprising:

(a) storage means for storing data defining the peripheral edges of said graphic product as machine readable data;

(b) a bonding web cooperating with a heat activated adhesive at one side of the web;

(c) feeding means for feeding said layer of sheet material releasably secured to a carrier sheet and said bonding web through said apparatus with said one side of the web bearing the adhesive adjacent the layer of sheet material;

(d) heating means having a plurality of selectively energizable heating elements positioned relative to the feeding means so as to place the heating elements into contact with the bonding web adjacent the layer of sheet material; and (e) control means interfaced with the storage means and connected to the feeding means and the heating means to cause said heating elements to be selectively energized in response to said stored data to activate the adhesive on the web in a substantially continuous pattern registering with one of said portions of the layer of sheet material as the feeding means feeds the bonding web and layer of sheet material releasably secured to a carrier sheet relative to the heating means to attach the web to said one of said portions of the sheet material.

2. An apparatus for manufacturing a graphic product as in claim 1, wherein said bonding web comprises:

(a) a first layer formed from a polyester material and having a first melting temperature;

(b) a second layer formed from a friction reducing material coating said first layer for ease of advancement of said bonding web adjacent said heating means; and (c) the heat activated adhesive is a third layer formed from polyethylene secured to said first layer and having a melting temperature lower than the melting temperature of the first layer.

3. An apparatus for manufacturing a graphic product as in claim 2, wherein said friction reducing material is formed from a silicone material.

4. An apparatus for manufacturing a graphic product as in claim 1, wherein said feeding means comprises two sprockets having engaging pins extending therefrom to engage feed holes in said layer of sheet material releasably secured to a carrier sheet.

5. An apparatus for manufacturing a graphic product as in claim 4, wherein said apparatus further comprises a data controlled cutter means connected with the storage means and also responsive to said stored data defining the peripheral edges of said graphic product for generating the lines of cut defining the periphery of a graphic product as well as said portions, said cutter means also having feeding means in the form of sprockets with engaging pins for engaging said feed holes and feeding said layer of sheet material releasably secured to a carrier sheet.

6. An apparatus for manufacturing a graphic product as in claim 5, further comprising:

(a) guide means connected between said cutting means and the heating means for guiding said layer of cut sheet material releasably secured to a carrier sheet from the cutting means to the heating means; and (b) supply means for supplying said bonding web onto said layer of sheet material releasably secured to a carrier sheet on said guide means between the cutting means and the heating means.

7. An apparatus for manufacturing a graphic product as in claim 1, further comprising:

supply means for holding a supply of said sheet material releasably secured to carrier sheet and said bonding web; and delivery means for supplying said layer of sheet material releasably secured to a carrier sheet and said bonding web together to said feeding means.

8. An apparatus for manufacturing a graphic product as in claim 4, wherein said feeding means further comprises:
(a) a roller platen rotatable about a central axis and having a smooth roller surface supporting the bonding web and layer of sheet material on the carrier sheet adjacent said heating elements and frictionally engaging said carrier sheet and supporting said layer of sheet material releasably secured to said carrier sheet and said bonding web adjacent said thermal head; and
(b) drive means connected to rotate said sprockets and the roller platen to move said layer of sheet material attached to said carrier sheet and said bonding web past the heating elements.

9. An apparatus according to claim 8, wherein the drive means rotates said roller platen at a slightly greater peripheral speed than said sprockets.

10. An apparatus for manufacturing a graphic product as in claim 1, further comprising pressure generating means for pressing said heating means against said layer of sheet material releasably secured to a carrier sheet and said bonding web to assist in attaching said bonding web to said one of said portions.

* * * * *